(12) United States Patent
Lotito et al.

(10) Patent No.: US 6,275,763 B1
(45) Date of Patent: *Aug. 14, 2001

(54) TEMPERATURE DEPENDENT REGENERATIVE BRAKE SYSTEM FOR ELECTRIC VEHICLE

(75) Inventors: David James Lotito, Lathrup Village, MI (US); Clement Newman Sagan, Ithaca, NY (US); Jack H. Xu, Plochingen (DE)

(73) Assignees: Ford Global Technologies, Inc.; Eaglestar Electric Drive Systems LLP, both of Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,281

(22) Filed: Mar. 24, 2000

(51) Int. Cl.[7] .................................................. B60T 7/12
(52) U.S. Cl. ....................... 701/71; 701/70; 303/152; 303/191; 318/376; 180/165; 188/DIG. 1
(58) Field of Search .................... 701/70, 71, 73, 701/80; 303/152, 155, 191; 318/362, 376; 180/165; 188/156, DIG. 1

(56) References Cited

U.S. PATENT DOCUMENTS

| | | | |
|---|---|---|---|
| 5,050,936 | * 9/1991 | Tanaka et al. | 303/3 |
| 5,343,970 | 9/1994 | Severinsky | 180/65.2 |
| 5,358,317 | 10/1994 | Cikanek | 303/100 |
| 5,450,324 | 9/1995 | Cikanek | 701/79 |
| 5,615,933 | 4/1997 | Kidston et al. | 74/512 |
| 5,916,330 | 6/1999 | Jacobson | 303/152 |
| 6,070,953 | * 6/2000 | Miyago | 303/152 |

FOREIGN PATENT DOCUMENTS 07266912  10/1995 (JP).

* cited by examiner

Primary Examiner—William A. Cuchlinski, Jr.
Assistant Examiner—Yonel Beaulieu
(74) Attorney, Agent, or Firm—Price Heneveld Cooper DeWitt & Litton

(57) ABSTRACT

A braking system for a motor vehicle having braking wheels 16, 18, a service brake pedal, a friction braking system operative upon the braking wheels 16, 18 in response to actuation of the vehicle brake pedal 26, an anti-lock braking system cooperative with the friction braking system to control the friction braking force applied to the braking wheels 16, 18 upon detection of slippage of the braking wheels 16, 18, a regenerative braking system operative upon the braking wheels 16, 18 in response to actuation of the vehicle brake pedal 26 for selectively generating an applied regenerative braking force through the braking wheels 16, 18, and an ambient temperature sensor 52. The regenerative braking system operates at a first effective rate of applied regenerative braking force upon application of the brake pedal 26 at an ambient temperature above a desired temperature, and the regenerative braking system operates at a second, lower effective rate of applied regenerative braking force at an ambient temperature below a desired temperature. Upon activation of the anti-lock braking system, the applied regenerative braking force is reduced at a first predetermined rate when the ambient temperature is above a desired temperature and the regenerative braking force is reduced at a second, faster predetermined rate when the ambient temperature is below a desired temperature.

20 Claims, 2 Drawing Sheets

TEMPERATURE DEPENDENT REGENERATIVE BRAKE SYSTEM FOR ELECTRIC VEHICLE

FIELD OF THE INVENTION

This invention relates to a regenerative braking system for a motor vehicle used to recapture vehicle kinetic energy during a braking event. More particularly, the present invention relates to a control strategy for a vehicle equipped with both a regenerative braking system and an anti-lock brake system for selectively controlling the regenerative braking effort provided by the regenerative braking system.

DESCRIPTION OF THE RELATED ART

Electric motor vehicles typically incorporate regenerative braking, delivered to the drive wheels by the electric motor, to supplement the friction brake system and to recover a portion of the vehicle's kinetic energy during the braking event to increase vehicle range. Regenerative braking may be applied whenever the driver deactivates the accelerator pedal, sometimes referred to as compression regeneration, and is applied more aggressively when the driver presses the brake pedal, commonly referred to as service brake regeneration.

It is also common in recent years to provide vehicles with anti-lock brake systems adapted to detect and modulate excessive vehicle slip, which typically occurs when the vehicle is operated upon a low coefficient of friction surface. Upon application of the vehicle's friction service brakes and detection of wheel slip, the anti-lock braking system modulates the brake forces applied by the friction brake system, typically by intermittently removing the hydraulic pressure applied to the friction service brakes at a desired frequency and amplitude. This feature prevents the wheels from locking and allows the vehicle driver to maneuver the vehicle during what otherwise would have been a purely skidding event. Since the anti-lock braking system controls only the friction brake system when wheel slip has been detected, service brake and/or compression regeneration must be selectively terminated to give the anti-lock braking system full control of vehicle braking. Thus, the prior solution, employing a constant rate of removal of a fixed regenerative braking effort across all temperatures, was biased toward a cold weather/slick road setting, which required rapid removal of regenerative braking for good anti-lock braking system control.

However, apparent wheel slippage can arise in at least two contexts. In the first context are the events noted above, where the braking force developed by one or more wheels exceeds the available surface friction of the road surface, such as on snow or ice. Anti-lock braking intervention is beneficial in this context because it optimizes braking system performance and improves vehicle control. In the second context are non-slippage events, which occur when the wheel travels over a bump and loses contact with the road surface. Without contact with the road surface, the wheels will rapidly decelerate if braking force is applied. To a vehicle provided with an anti-lock braking system, this rapid acceleration appears as excessive wheel slip. The anti-lock braking system is thus placed in control of the braking event, which leads to an unnecessary termination in service brake regeneration. Also, the undesired harshness of bump activation through an anti-lock braking system is aggravated by the rapid reduction in service brake and/or compression regeneration. Thus, solutions were sought that would allow a reduction in regenerative braking upon activation of an anti-lock braking system during actual slippage, but incorporate a strategy that did not aggravate wheel bump-activation harshness when slippage is erroneously detected.

SUMMARY OF THE INVENTION

According to the present invention, a temperature dependent regenerative braking strategy adapts the regenerative braking parameters based upon the ambient temperature. By employing temperature dependence, the regenerative braking system control provides lower overall regenerative braking levels during cold weather driving and a faster service brake regeneration removal rate (also known as slew-out rate). This provides improved anti-lock braking system control on slick surfaces. The temperature dependence also allows for higher service brake regeneration levels at warmer temperatures, when very slick surfaces are less likely. In addition, a slower slew-out rate employed at warmer temperatures further reduces the harshness of wheel bump activation events.

Thus, a brake system for a motor vehicle has a friction braking system and a service brake regeneration system, controlled by a braking system controller, where the friction brake system is operative upon actuation of a brake pedal by the motor vehicle operator. The friction brake system further includes an anti-skid brake system controlled through the anti-skid braking system controller, in communication with the braking system controller, for selectively controlling braking effort to the wheels upon detection of slippage of one or more wheels relative to the road surface. The service brake regeneration brake system is operated at a first effective applied regeneration braking force upon application of the brake pedal at a temperature above a first predetermined temperature and operative at a second, lower applied regeneration braking force at a temperature below a second predetermined temperature. The service brake and/or compression regeneration system is also controlled to apply a high rate of reduction in the current flow from the electric motor to the battery and applied regenerative braking force at ambient temperatures below a predetermined temperature and a relatively low rate of reduction in current flow to the battery from the electric motor and applied regenerative braking force at ambient temperatures above a predetermined temperature.

In its preferred form, the present service brake regeneration is applied at 100% effectiveness at ambient temperatures above 60° F. and at 10% or less effectiveness at ambient temperatures below 40° F. For ambient temperatures between 60° F. and 40° F., the effectiveness of the service brake regeneration is reduced in a linear relationship with the ambient temperature. Thus, the service brake regeneration is not as biased toward cold weather operation as with previous systems.

Also, the rate at which the service brake and/or compression regeneration is removed as a consequence of wheel slippage is reduced at warmer temperatures, such as above 60° F., where true skidding is less likely to occur. Similarly, the rate at which service brake regeneration is removed is accelerated at a lower temperature, such as below 45° F., where true skidding is more likely to occur. For ambient temperatures between 60° F. and 45° F., the rate of removal of the service brake and/or compression regeneration is gradually increased as the ambient temperature decreases. The result is a system where service brake and/or compression regeneration is removed far more slowly during warmer temperatures, where it is more likely that wheel bounce only is the triggering event for activation of the anti-lock braking system and where application of as high a level of service brake and/or compression regeneration as possible is most desired.

The above brief description sets forth rather broadly the more important features of the present disclosure so that the detailed description that follows may be better understood and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the following description or drawings. The regenerative braking system of the present disclosure is capable of other embodiments and of being practiced and carried out in various ways. Also, it is to be understood that the phraseology and terminology employed herein are for description and not limitation. Where specific dimensional material specifications have been included or omitted from the specification of the claims, or both, it is to be understood that the same are not to be incorporated into the appended claims.

As such, those skilled in the art will appreciate the conception, upon which this disclosure is based, may readily be used as a basis for designing other structures, methods and systems for carrying out the purposes of the present invention. It is important therefore that the claims are regarded as including such equivalent instructions as far as they do not depart from the spirit and scope of the present invention.

Further, the purpose of the Abstract is to enable the U.S. Patent and Trademark Office and the public generally, especially the scientists, engineers and practitioners in the art who are not familiar with the patent or legal phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other features, advantages and objects of the present invention will be further understood and appreciated by those skilled in the art by reference to the following specification, claims and appended drawings.

BRIEF DESCRIPTION OF THE DRAWINGS

The disclosure of the temperature dependent regenerative brake system for an electric vehicle is explained with illustrative embodiments shown in the accompanying drawings, where.

DETAILED DESCRIPTION OF PREFERRED EMBODIMENT

Figure 1:
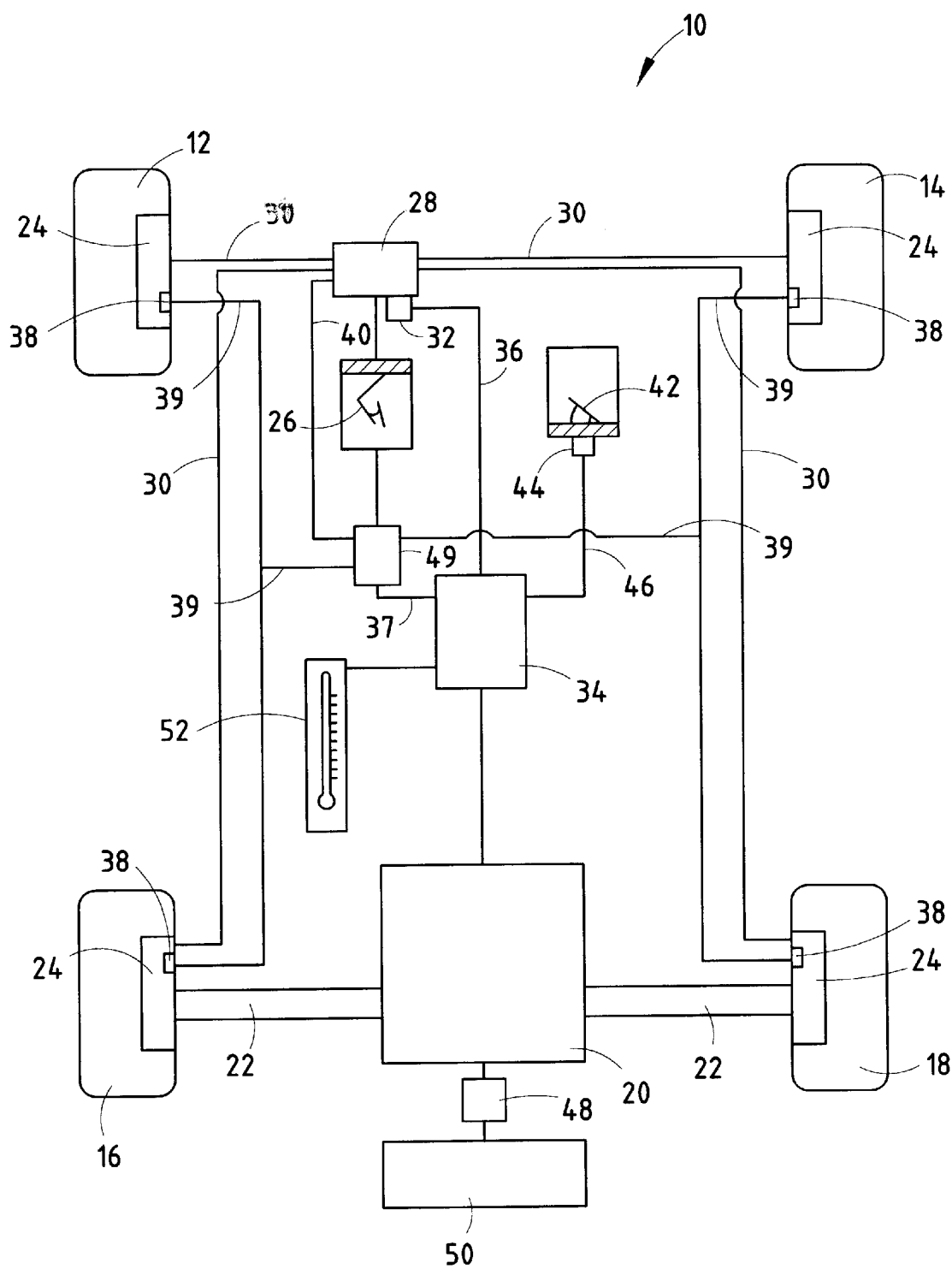
FIG. 1 is a schematic view of an electrically driven motor vehicle equipped with the temperature dependent regenerative braking system according to the present invention.

The best mode for carrying out the invention is presented in terms of the preferred embodiment wherein similar reference characters designate corresponding features throughout the figures of the drawings. Referring now to the drawings, particularly FIG. 1, there is shown a motor vehicle 10 having a plurality of wheels 12, 14, 16 and 18 for operation upon a road surface. It should be understood that the term road surface as used herein includes any surface upon which the vehicle 10 may be adapted to operate. An electric motor 20 is provided as the drive motor for driving the rear wheels 16 and 18 through drive shafts 22. While the preferred embodiment utilizes electric motor 20 only as the drive motor, it is contemplated, as being within the scope of the present invention, to further incorporate an internal combustion engine into the vehicle, such as typically found in hybrid vehicles.

Each of the wheels 12, 14, 16, 18 are further preferably provided with a conventional friction brake 24 applied simultaneously at each wheel upon actuation of the service brake pedal 26 by the vehicle operator, whereupon a friction brake master cylinder 28 provides hydraulic pressure to each of the friction brakes 24 via hydraulic lines 30. A brake pressure sensor 32 is also provided, as is known, to indicate to a regenerative brake controller 34 via line 36 when the vehicle friction brake system has been activated. If desired a brake pedal position sensor or a brake switch may be used, the latter, however, producing modulation by the brake controller 34. Each wheel is also provided with a sensor 38 for detecting slippage in any of the wheels, manifested as sudden or rapid angular deceleration of any of the wheels 12, 14, 16, 18, that communicates with anti-lock brake system ("ABS") controller 49 via lines 39.

In the event that the slip sensor 38 detects slippage in one or more of wheels 12, 14, 16, 18 upon application of the friction brakes 24, the ABS controller 49 will signal master cylinder 28, or some other adapted controlling device, via line 40 to intermittently apply a braking force to the wheels 12, 14, 16, 18, and thus to obtain a so-called anti-lock brake system. The ABS controller 49 will also send a signal via line 37 to regenerative brake controller 34 to indicate the presence of an ABS event. As is commonly known, anti-lock braking devices are widely used to improve vehicle handling and performance on low friction road surfaces, such as road surfaces covered by snow, ice or water. While the ABS controller 49 and the regenerative brake controller 34 are preferably independent, it is contemplated, as within the scope of the invention, that the ABS controller 49 could be directed by the regenerative brake controller 34.

The electric motor 20 can also be advantageously employed to assist in vehicle braking. Each braking event normally begins with the vehicle operator deactivating the accelerator pedal 42. Throttle position sensor 44 detects this release of throttle application through the change in throttle position and transmits this information to regenerative braking controller 34 via line 46. Regenerative braking controller 34 then terminates current flow from a battery 50 via current flow regulator 48 to the electric motor 20. The regenerative braking controller 34 also reverses the operation of the electric motor 20 by reversing current flow to a preset current flow, to recharge the battery 50, a process also know as compression regenerative braking. This reversal of current flow induces a first, relatively low level braking force to the driven wheels 16, 18. Upon application of the brake pedal 26, the current flow from the electric motor 20 to the battery 50 is increased significantly, thus providing additional braking effort as a supplement to the friction brakes 24 discussed above while further recharging the battery 50. This is known as service brake regeneration ("SBR").

In braking systems of the prior art, where both friction brake and service brake regeneration systems were provided, difficulties arose when anti-lock braking systems were employed. In the event that the friction brakes 24 are applied in cold temperatures, any wheel that experienced rapid wheel angular deceleration is interpreted by the slip sensor 38 as skidding. ABS controller 49 therefore initiates anti-lock modulation of the friction braking system to provide improved vehicle control. If the service brake regeneration system was still operative, the efforts of the anti-lock braking system to provide an intermittent braking force and the desired vehicle control would be confounded. Accordingly, systems of the prior art were forced to deactivate or quickly reduce service brake and/or compression regeneration during an anti-lock braking system event.

In cold weather, where actual wheel slippage is far more likely to occur, this strategy is necessary. However, this strategy can produce undesirable harsh driving events. These harsh driving events particularly arise when the driving wheels hop or bounce relative to the road surface, where the wheel loses contact with the road surface, also known as wheel bump-activation. If the friction brakes 24 are applied during such an event, the slip sensor 38 will detect rapid angular deceleration of the airborne wheel, erroneously interpreted by ABS controller 49 as the wheel skidding, resulting in the initiation of anti-lock control and termination of service brake and/or compression regeneration. However, the abrupt reduction of the current flow from the electric motor 20 to the battery 50, also know as a high slew-out rate, tends to magnify the undesirably harsh driving experience during wheel bump-activation.

In accordance with the present invention, objectionable wheel bump-activation harshness is reduced by adoption of a control strategy that compensates for ambient temperatures. Ambient temperatures are measured through any of several devices available, depicted herein as temperature sensor 52 operatively connected with controller 34. As shown in detail in the control strategy disclosed in FIG. 2, when at the beginning 100 the throttle position sensor 44 detects the throttle position and determines if the throttle 42 is applied or released 101. The regenerative brake controller 34 applies compression regeneration 102 if the throttle 42 is released. The ambient temperature sensor 52 measures the ambient temperature and compares this temperature to a first predetermined temperature 103, where the probability of skidding is low. Service brake regeneration effort or effectiveness 104 is preferably applied at full or 100% effectiveness according to the standard service brake regeneration map 106, when the brake pedal 26 is actuated to apply the brake 108, unless an anti-lock braking event occurs. Conversely, when the ambient temperature is below a second predetermined temperature 110, that is, during cold weather operation, where the probability of actual wheel slippage due to a low friction road surface is high, the service brake regeneration effort 104 is applied at a lower effectiveness 112, preferably 10% of full service brake regeneration effectiveness.

In the preferred embodiment, the first, or higher, predetermined temperature 103 for determining the initial effectiveness of the service brake regeneration is equal to or greater than 60° F., while the second predetermined temperature 110 is 40° F. or less. For temperatures between 40° F. and 60° F., the initial application of service brake regeneration braking effort or effectiveness 104 preferably varies linearly between 10% and 100%, respectively, according to the relationship 114:

$$\% \text{ SBR} = (0.1 + 0.9 * (T_{AMB} - 40)/20)$$

where % SBR is service brake regeneration effectiveness 104 and $T_{AMB}$ equals the ambient temperature. However, it should be noted that although the preferred first and second predetermined temperatures 103, 110 are 60° F. and 40° F. respectively, these temperatures can be the same and the advantages of the present invention can still be obtained. For example, it is contemplated that ambient temperatures above a mid range temperature, such as 50° F., could be used as the threshold for application at the full effectiveness 104 of service brake regeneration, e.g, 100% SBR above 50° F., or at a reduced service brake regeneration effectiveness 112 if the ambient temperature is below 50° F., e.g. 20% SBR below 50° F. Likewise, while it is preferred to vary the effectiveness of the service brake regeneration linearly between the first and second predetermined temperatures 103, 110, this relationship can also take more or less aggressive profiles.

Figure 2:
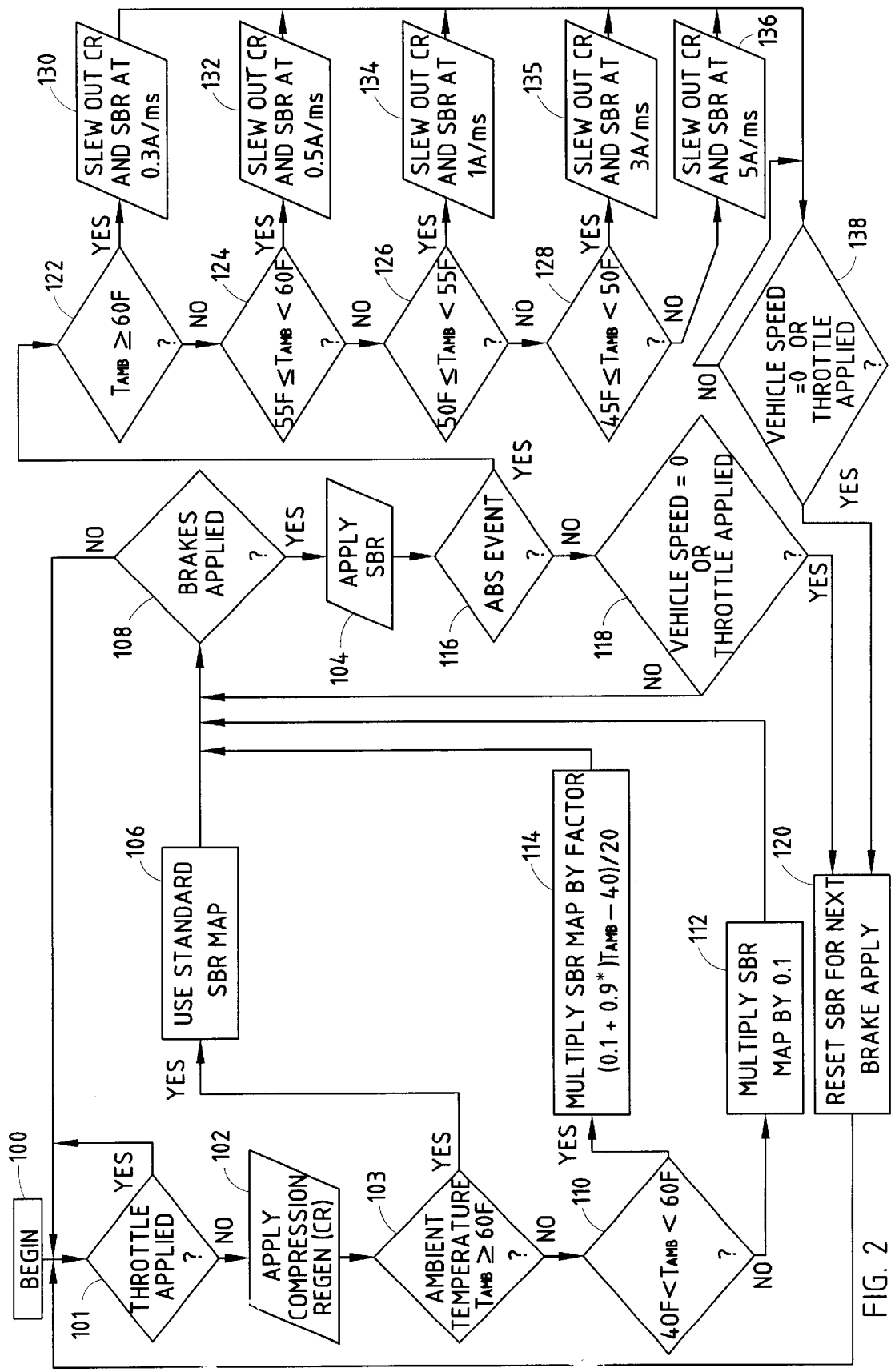
FIG. 2 is a block diagram indicating the control strategy for controlling the temperature dependent regenerative braking system of the present invention.

As further shown in FIG. 2, after initiation of a braking event 108 and initial application of the selected service brake regeneration effectiveness 104, the ABS controller 49 monitors the slip sensors 38 to determine if an anti-lock braking event 116 is occurring. If not, the brake controller 34 determines whether the vehicle has come to a complete stop or if the accelerator pedal 42 has been activated, either event indicating that the braking event 118 has ended and resulting in resetting of the system 120.

If, however, an anti-lock braking event 116 is detected, the ABS controller 49 then signals controller 34 to measure the ambient temperature and compare this temperature to threshold temperature ranges 122, 124, 125, 128 to determine the appropriate slew-out rate or rate of regeneration current reduction 130, 132, 134, 135, 136. As noted above, this rate differentiates between a true anti-lock braking event, where service brake and/or compression regeneration 104 should be rapidly removed, and an erroneously indicated anti-lock braking event, where service brake and/or compression and/or compression regeneration 104 should be maintained as high as possible for as long as possible to minimize wheel bump-activation harshness.

To avoid an anti-lock braking event 116 that will result in harsh wheel bump-activation, the service brake and/or compression regeneration slew-out rate, or current flow reduction rate, is lowest at high temperatures. That is, the rate of current flow reduction through the service brake and/or compression regeneration, indicative of the instantaneous braking effort added by regenerative braking, is more slowly removed, thereby reducing wheel bump-activation harshness. Moreover, during an anti-lock braking event 116 at low temperatures, the slew-out rate, or current flow reduction rate, is significantly accelerated to more quickly reduce the braking effort from the service brake regeneration system, thereby placing the vehicle more immediately under the full control of the anti-lock braking system and allowing for greater vehicle maneuverability.

As shown in FIG. 2, the slew-out rate 130 is preferably lowest at an ambient temperature 122 equal to or above 60° F., where the current flow from the electric motor 20 to the battery 50 is reduced by the controller 34 by only 0.3 amperes per millisecond. At ambient temperatures 124 between 55° F. and 60° F., the slew-out rate 132 is increased to 0.5 amperes per millisecond, while from ambient temperatures 126 from 50° F. to 55° F., the slew-out rate 134 rises to 1 ampere per millisecond. At ambient temperatures 128 between 45° F. and 50° F., the slew-out rate 134 preferably rises to 3 amperes per millisecond, while, finally, at temperatures below 45° F., the slew-out rate 136 is maximized at 5 amperes per millisecond. This final slew-out rate quickly reduces any residual service brake regeneration to levels sufficiently low so as not to interfere with the function of and control offered by the anti-lock braking system. Again, it should be noted that the high and low temperatures for varying the slew rate can be the same, that is, to simplify the system the system could apply a single slow slew-out rate above 50° F. and a single fast slew-out rate below 50° F. As before, the system resets itself 120 upon detecting that the vehicle speed is zero or that the accelerator pedal 42 has been reactivated, either event 138 signaling an end to the braking event.

The drawbacks of the prior art have thus been overcome in an economical, practical and facile matter. While the preferred embodiment and example configuration has been shown and described, it is understood that various modifications and additional configurations would be apparent to those skilled in the art. It is intended that the specific embodiments and configurations disclosed are illustrative of the preferred and best modes for practicing the invention and should not be interpreted as limitations on the scope of the invention, as defined by the appended claims, and is to be appreciated that various changes, rearrangements and modifications may be made therein without departing from the scope of the invention as defined by the appended claims as interpreted according to the principles of patent law, including the doctrine of equivalents.

We claim:

1. A braking system for a motor vehicle having a plurality of wheels for operation upon a road surface, wherein at least one of said plurality of wheels is a braking wheel, a vehicle service brake pedal, a friction braking system operative upon said braking wheel in response to actuation of the vehicle brake pedal for applying a friction braking force through said braking wheel, an anti-lock braking system cooperative with said friction braking system to control the friction braking force applied to said braking wheel upon detection of slippage of said braking wheel relative to the road surface, a regenerative braking system operative upon said braking wheel in response to actuation of the vehicle brake pedal for selectively generating an applied regenerative braking force through said braking wheel, and an ambient temperature sensor, said regenerative braking system operative at a first effective applied regenerative braking force upon application of said brake pedal at an ambient temperature above a first predetermined temperature and said regenerative braking system operative at a second effective applied regenerative braking force at an ambient temperature below a second predetermined temperature, said first effective applied regenerative braking force exceeding said second effective applied regenerative braking force.

2. The braking system of claim 1, wherein said first effective applied regenerative braking force is 100 percent of the available regenerative braking force and said second effective applied regenerative braking force is 10 percent or less of the available regenerative braking force.

3. The braking system of claim 1, wherein the first and second predetermined temperatures are the same.

4. The braking system of claim 1, wherein said first predetermined temperature exceeds said second predetermined temperature.

5. The braking system of claim 4, wherein said effective applied regenerative braking force varies in a linear relationship with the ambient temperature between said first and second predetermined temperatures.

6. The braking system of claim 4, wherein the first predetermined temperature is equal to or greater than 60° F. and said second predetermined temperature is equal to or less than 40° F.

7. The braking system of claim 1, wherein said effective applied regenerative braking force is controlled by regulation of the current flow from said regenerative braking system and, upon activation of said anti-lock braking system, said current flow and said effective applied regenerative braking force is reduced over time at a first predetermined rate corresponding to a third predetermined temperature and a second, faster predetermined rate corresponding to a fourth predetermined temperature.

8. A braking system for a motor vehicle having a plurality of wheels for operation upon a road surface, wherein at least one of said plurality of wheels is a braking wheel, a vehicle service brake pedal, a friction braking system operative upon said braking wheel in response to actuation of the vehicle brake pedal for applying a friction braking force through said braking wheel, an anti-lock braking system cooperative with said friction braking system to control the friction braking force applied to said braking wheel upon detection of slippage of said braking wheel relative to the road surface, a regenerative braking system operative upon said braking wheel in response to actuation of the vehicle brake pedal for selectively generating an applied regenerative braking force through said braking wheel, and an ambient temperature sensor, said regenerative braking system being controlled by regulation of the current flow from said regenerative braking system and, upon activation of said anti-lock braking system, said current flow and said applied regenerative braking force being reduced over time at a first predetermined rate at a temperature above a first predetermined ambient temperature and said current flow and said applied regenerative braking force being reduced over time at a second, faster predetermined rate below a second predetermined temperature.

9. The braking system of claim 8, wherein said regenerative braking system is operative at a first effective applied regenerative braking force upon application of said brake pedal at an ambient temperature above a third predetermined temperature and said regenerative braking system is operative at a second, lower effective applied regeneration braking force at an ambient temperature below a fourth predetermined temperature.

10. The braking system of claim 8, wherein said third predetermined temperature is higher than said fourth predetermined temperature.

11. A braking system for a motor vehicle having a plurality of wheels for operation upon a road surface, wherein at least one of said plurality of wheels is a braking wheel, a vehicle service brake pedal, a friction braking system operative upon said braking wheel in response to actuation of the vehicle brake pedal for applying a friction braking force through said braking wheel, an anti-lock braking system cooperative with said friction braking system to control the friction braking force applied to said braking wheel upon detection of slippage of said braking wheel relative to the road surface, a regenerative braking system operative upon said braking wheel in response to actuation of the vehicle brake pedal for selectively generating an applied regenerative braking force through said braking wheel, and an ambient temperature sensor, said regenerative braking system operative at a first effective rate of applied regenerative braking force upon application of said brake pedal at an ambient temperature above a first predetermined temperature and said regenerative braking system operative at a second, lower effective rate of applied regenerative braking force at an ambient temperature below a second predetermined temperature, and, upon activation of the anti-lock braking system, said applied regenerative braking force being reduced over time at a first predetermined rate at an ambient temperature above a third predetermined temperature and said regenerative braking force being reduced over time at a second, faster predetermined rate at an ambient temperature below a fourth predetermined temperature.

12. The braking system of claim 11, wherein said first effective applied regenerative braking force is 100 percent of the available regenerative braking force and said second effective applied regenerative braking force is 10 percent or less of the available regenerative braking force.

13. The braking system of claim 11, wherein the first and second predetermined temperatures are the same.

14. The braking system of claim 11, wherein said first predetermined temperature exceeds said second predetermined temperature and said third predetermined temperature exceeds said fourth predetermined temperature.

15. The braking system of claim 14, wherein said applied regenerative braking force varies in a linear relationship with the temperature between said first and second predetermined temperatures.

16. The braking system of claim 14, wherein the first and third predetermined temperatures are equal to or greater than 60° F., said second temperature is equal to or less than 40° F. and said fourth predetermined temperature is equal to or less than 45° F.

17. The braking system of claim 14, wherein the rate of reduction of the applied regenerative braking force varies in relation to the ambient temperature between said third and fourth predetermined temperatures.

18. A method for reducing bump-activation harshness induced by an anti-lock brake system of a motor vehicle having a plurality of wheels for operation upon a road surface, wherein at least one of said plurality of wheels is a braking wheel, a vehicle service brake pedal, a friction braking system operative upon said braking wheels in response to actuation of the vehicle brake pedal for applying a friction braking force through said braking wheel, said anti-lock brake system cooperative with said friction braking system to control the friction braking force applied to said braking wheel upon detection of slippage of said braking wheel relative to the road surface, a regenerative braking system operative upon said braking wheel in response to actuation of the vehicle brake pedal for selectively generating an applied regenerative braking force through said braking wheel, and an ambient temperature sensor, the method comprising the steps of:

measuring the ambient temperature through said ambient temperature sensor;

comparing the ambient temperature to a first predetermined temperature and a second predetermined temperature;

operating said regenerative braking system at a first effective applied regenerative braking force upon application of said brake pedal if the ambient temperature is above said first predetermined temperature and operating said regenerative braking system at a second, lower effective applied regenerative braking force if the ambient temperature is below a second predetermined temperature, and regulating said regenerative braking system, upon activation of the anti-lock brake system, to reduce said regenerative braking force over time at a first predetermined rate corresponding to a third predetermined temperature and at a second, faster predetermined rate corresponding to a fourth predetermined temperature.

19. The braking system of claim 18, wherein the first and third predetermined temperatures are equal to or greater than 60° F., said second predetermined temperature is equal to or less than 40° F. and said fourth predetermined temperature is equal to or less than 45° F.

20. The braking system of claim 18, wherein said effective rate of regenerative braking force varies in a linear relationship with the temperature between said first and second predetermined temperatures.

* * * * *

UNITED STATES PATENT AND TRADEMARK OFFICE
CERTIFICATE OF CORRECTION

PATENT NO. : 6,275,763 B1
DATED : August 14, 2001
INVENTOR(S) : David James Lotito et al.

It is certified that error appears in the above-identified patent and that said Letters Patent is hereby corrected as shown below:

<u>Title page,</u>
Item [73], Assignees, "Eaglestar Electric Drive Systems LLP" should be -- Ecostar Electric Drive Systems LLC --.

Signed and Sealed this

Twenty-second Day of October, 2002

*Attest:*

JAMES E. ROGAN
*Attesting Officer*        *Director of the United States Patent and Trademark Office*